United States Patent [19]

Eirich et al.

[11] Patent Number: 4,854,715

[45] Date of Patent: Aug. 8, 1989

[54] PRESSURE-RESISTANT MIXER

[76] Inventors: Paul Eirich, Bahnhofstr. 11; Hubert Eirich, Sandweg 16; Walter Eirich, Spessartweg 16, all of 6969 Hardheim, Fed. Rep. of Germany

[21] Appl. No.: 870,439

[22] Filed: Jun. 4, 1986

[30] Foreign Application Priority Data

Jun. 7, 1985 [DE] Fed. Rep. of Germany ....... 3520409

[51] Int. Cl.[4] .......................... B01F 9/12; B01F 13/06; B01F 15/02; B29B 7/16

[52] U.S. Cl. ....................................... 366/139; 366/94; 366/188; 366/189; 366/194; 366/224

[58] Field of Search ................. 366/75, 187, 188, 139, 366/189, 221, 222, 224, 232, 213, 93, 94, 95; 99/348, 479; 34/92

[56] References Cited

U.S. PATENT DOCUMENTS

| | | | |
|---|---|---|---|
| 2,023,056 | 12/1935 | McCorkindale | 366/139 |
| 2,237,859 | 4/1941 | Bille | 366/95 |
| 2,651,582 | 9/1953 | Courtney | 366/221 X |
| 2,811,338 | 10/1957 | Beam | 366/95 |
| 2,931,633 | 4/1960 | Rumbel et al. | 366/139 |
| 3,544,522 | 12/1970 | Hahn | 366/139 X |
| 3,718,069 | 2/1973 | Plomer et al. | 366/224 X |
| 3,809,322 | 5/1974 | Hirosawa | 366/224 X |
| 4,053,990 | 10/1977 | Bielinski | 34/92 X |
| 4,120,050 | 10/1978 | Craig et al. | 366/75 |
| 4,289,407 | 9/1981 | Puthawala | 366/75 |
| 4,397,760 | 8/1983 | Story et al. | 366/224 X |
| 4,516,859 | 5/1985 | Spengler et al. | 366/77 |
| 4,522,118 | 6/1985 | Simonsen et al. | 366/139 X |
| 4,560,283 | 12/1985 | Eirich et al. | 366/192 X |

FOREIGN PATENT DOCUMENTS

| | | |
|---|---|---|
| 1074371 | 1/1960 | Fed. Rep. of Germany . |
| 1864737 | 1/1963 | Fed. Rep. of Germany . |
| 1607783 | 1/1971 | Fed. Rep. of Germany . |
| 1941831 | 3/1972 | Fed. Rep. of Germany . |
| 2428414 | 1/1976 | Fed. Rep. of Germany . |

*Primary Examiner*—Harvey C. Hornsby
*Assistant Examiner*—Scott J. Haugland
*Attorney, Agent, or Firm*—Howard M. Ellis; Michael L. Dunn

[57] ABSTRACT

Described is a pressure-resistant mixer with a feed opening (15), a rotating mixing container (1) with a drainage device (20) and with mixing tools (17) arranged eccentrically to the axis of the mixing container axis (35) inside the mixing container (1), and with drive motors (6, 22) and drive devices (33, 34) for driving the mixing devices (17) and/or the mixing container (1).

In order, on the one hand, to avoid sliding seals in contact with the materials being mixed, and, on the other, to avoid having to use extremely large size seals, is proposed in accordance with the invention to position the mixing container (1) inside a stationary pressure vessel (3).

14 Claims, 6 Drawing Sheets

PRESSURE-RESISTANT MIXER

Figure 1:
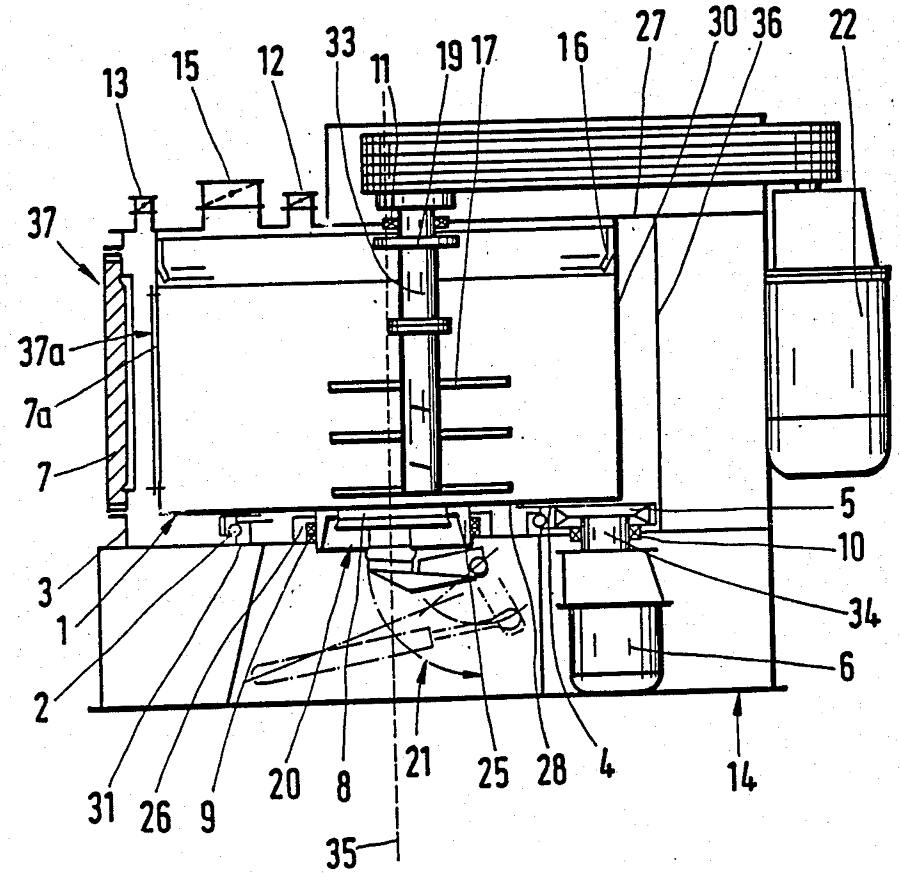

The invention relates to a pressure-resistant mixer with a feed-opening, a rotating mixing container with drainage device, with mixing tools mounted excentrically to mixing container axis inside the mixing container, and with drive motors and driving devices to drive the mixing tools and/or the mixing container.

For a great number of applications in process engineering the preparation of materials under pressure or vaccum is necessary or advantageous. The extraction of solvents, bubble-free preparation of paints, mixing and kneading of explosive substances under safety-gas, are examples of such applications.

In the present state of engineering, for such mixing applications (this term to be understood to cover also kneading, agglomeration, grinding, stirring, plasticising, etc.) it is mainly machines with stationary mixed material containers which are used.

These are mainly cylindrical mixed material containers of vertical or horizontal type with mixing tool shafts rotating centrally or with planetary motion.

The disadvantage with such machines is that the seals between the pressure vessel which at the same time constitutes the mixing container, and the mixing tool shafts projecting inside, lie within the area under impact from the mixed materials. These seals are thus subject to severe wear, contamination and also chemical attacks. This frequently makes necessary costly maintenance work in the area of the seals with correspondingly long machine stand-still times.

Furthermore, mixers working under pressure or vacuum are also known, the containers of which rotate on a horizontal or inclined axis. These machines generally have no mixing tools, but operate on the free-fall principle. The preparation of viscous and adhesive mixed materials in such machines is not possible, since the mounting of scrapers to clean the container walls is not possible. A further disadvantage of these machines is that they have to be stopped for charging and emptying each time, whereby the charging and emptying apertures have to be flanged onto the corresponding connected apparatus in each case. Furthermore, connection pipes for maintaining an under-pressure resp. over-pressure can only be mounted on such mixers concentrically to the driveshaft, which means that once again sliding seals under impact from the mixed materials are necessary.

All mixer designs for pressure or vaccuum operation had hitherto had the disadvantage that it is only possible with difficulty to fit anti-wear or protective linings inside the mixing containers by bolting. The pressure-tight sealing of a large number of bolt-holes passing through the walls is extremely costly and not reliable in operation. Threaded blind holes are also costly in application and furthermore such threaded blind holes are very liable to become contaminated.

The fixing of anti-wear linings by welding on the other hand makes replacement of the linings extremely difficult.

DE-PS No. 24 28 414 makes known a kneader in which the mixed materials container is surrounded on three sides by a pressure vessel. The two front sides and the top side are, however, simultaneously mixing container and pressure vessel walls.

The above mentioned problems relating to fixing of anti-wear linings also occur with these machines on the front sides.

Furthermore with these machines access to the mixing container, through the pressure vessel, particularly in the lower section, is very difficult, and yet it is precisely this area which is subject to the greatest wear.

The stationary asymmetrical container means that not all the sides can be covered by mixing tools or scrapers, so that the mixing of adhesive products is not efficient.

Furthermore the seals of the tool bearings which are under pressure are always within the mixed material range.

Finally, mixed material discharge via a worm conveyor is not suitable for highly viscous or coarse-grained mixed materials.

A range of mixing functions can be performed particularly well with so-called intensive mixers, which have a mixing plate (mixing container) rotating about a vertical or slightly inclined axis, with excentrically-mounted mixing tools mounted on this. Such machines have proved themselves in particular in the mixing of highly viscous, pasty and plastic masses. Until now it has not been possible to use this particularly effective mixing system for pressure or vacuum operation because the sliding seals required for this would have to be extremely big and furthermore would be expose also to harmful influences from the materials being mixed.

The technical problem that now requires to be solved is to make a pressure-resistant mixer which on the one hand has no sliding seals under impact from the mixed materials and on the other can work without using extremely large sliding seals on the principle of the intensive mixer.

This problem is solved by having a pressure vessel surrounding the mixing container.

This separation of pressure vessel and mixing container makes it possible to fit sliding seals in zones which do not come into contact with the mixed materials. Furthermore it is possible to mount an intensive mixer inside a pressure vessel, whereby the sliding seals used do not have their size fixed by the excentric arrangement of the mixing tools, but simply by the diameter of the drive shaft for the mixing tools and mixing container and by the diameter of a drainage hole.

It is advantageous in the sense of a simple and economic method of manufacture to have, in conformity with the invention, a pressure vessel consisting essentially of a cylindrical vessel with base, cover and wall and a mixing container consisting essentially of a cylindrical container with base, wall and no cover. Cylindrical containers can generally be made very easily and are, furthermore, very suitable above all as pressure vessels because of their geometric shape.

It is also advantageous if the mixing container is mounted so that it rotates inside the pressure vessel. In this way the principle of the intensive mixer can be applied.

In conformity with the invention it is an advantage, if the drive motor of the mixing container is mounted outside the pressure-vessel and as driving device a shaft is passed through the base of the pressure-vessel, equipped with a sliding seal, and with a pinion mounted at its end inside the pressure vessel meshing with a toothed wheel in the bottom of the mixing container.

In this way the motor is made easily accessible and easy to cool, and the required sliding seal of the driveshaft lies outside the mixing container and is thus not exposed to the influences of the mixed materials.

A further advantageous embodiment of a mixer in conformity with the invention is characterised in that the drive motor of the mixing container is mounted outside the pressure vessel and in that as driving device a shaft with sliding seal is passed through a flexible sleeve in the base of the pressure container, the said shaft having at its end inside the pressure vessel a friction wheel mounted which is applied to a drive ring of the mixing container.

The driving of mixing containers by means of friction wheels has proved to be particularly low in maintenance and noise. The flexibility of the friction wheel, however, makes necessary a flexible bearing of drive motor and drive shaft also. To compensate for the radial motion of the motor shaft in relation to mixing container axis the sliding seal of the shaft or its sleeve-mounting, consisting e.g. of a rubber plate, can be connected with the pressure vessel housing. Such a sleeve has at the same time an advantageous sound and vibration-damping effect.

Also advantageous with a mixer according to the invention is the mounting of the drive motor for the mixing tools outside the pressure vessel on the latter's cover or side wall or on the machine frame, with connection to the mixing tools inside the mixing container via a shaft passing through the cover of the pressure vessel and equipped with a sliding seal.

In this case also the motor is easily accessible and the sliding seal for the mixing tool shaft does not in general come into contact with the mixed materials either, since it is mounted on the cover of the pressure vessel. In the case of mixed materials which are extremely turbulent it is advantageous to equip the shaft with an additional protective ring under the sliding seal.

A further advantage according to the invention is characterised in that in the base of the pressure vessel concentric to the axis of the mixing container and a drainage hole in the base of the mixing container, there is a through-opening which is formed by a drainage ring mounted round the edge of the drainage-hole, and which is connected on its outside via a sliding seal with a sealing rim in the base of the pressure vessel concentric to the through-opening.

Since the mixing container is mounted inside the pressure vessel, and since with this embodiment of the invention there is a drainage-hole with a sealing cover in the centre of the mixing container, a through-opening is advantageously provided concentric to the drainage-hole in the base of the pressure vessel located underneath it. This through opening serves on the one hand for the passage of the sealing cover of the drainage opening and on the other hand also for the passage of the mixed materials flowing or falling out of the drainage hole. Through- and drainage-apertures are connected to each other via a drainage ring, the upper edge of which is advantageously tightly and firmly connected and sealed with the edge of the drainage hole and its bottom edge is connected with the sealing rim of the through hole of the pressure vessel via a sliding seal mounted on its outside. The through-opening is thus formed through the lower inner part of the drainage ring.

This aperture system has the advantage that the sliding seal between drainage ring and sealing edge can have a minimum diameter, so that the user can, if necessary, use relatively inexpensive seals of standard dimensions obtainable from normal dealers. The sliding seal system has the further advantage that it does not come into contact with the mixed materials.

A further advantage is also that the sealing cover for the drainage hole is rotatably mounted on the cover mechanism, and in closed stated is connected in a fixed way via a stationary seal with the rotating mixing container. Stationary seals can be made of essentially less sensitive and stronger materials than sliding seals and can furthermore also be fixed by pressing to the sealing surfaces, so that there is no problem in their being under impact from the mixed materials since without relative movement between cover and opening rim no seal wear can occur.

In an embodiment of the pressure-resistant mixer for easily flowing mixed materials it is advantageous to have a suction pipe passing through the cover of the pressure vessel which is moveable and essentially perpendicular to cover plane and which is sealed against the cover on its outside, for the removal of extractable mixed materials.

In this way the drainage opening in the mixing container bottom can be replaced by the suction pipe. The mixed materials can then, at the end of the mixing time be extracted from the mixer by means of a pump. The cover and related drive components necessary for the cover are not required with this solution, and the diameter of the sliding seals required is limited to the diameter of a drive or bearing shaft for the mixing container, which in this case can also be advantageously centrally mounted.

The suction pipe is preferably mounted so that it can be raised and lowered, and thus during the mixing operation, in which the mixed materials can under some circumstances become extremely viscous, there is no interference with mixed materials circulation.

The seal surrounding the suction pipe can be e.g. a pinch-type screw union permitting the raising and lowering of the suction pipe and at the same time also acting as an arresting device by the means of which the suction pipe aperture can be held at the respective required height. The expert engineer can select the most suitable seal and/or fixing device for the respective application.

In continuous operation, the bottom edge of the suction pipe can be set in such a way that the distance from the mixing container bottom corresponds to the required mixed materials layer height. With continuous operation, the respective filling level then also corresponds precisely to the average stay-time of the mixed materials.

If there is an under-pressure inside the pressure vessel, the pressure in the suction pipe must naturally be below the residual pressure of the pressure vessel, to make extraction possible at all. If necessary the pressure vessel can, during extraction of mixed materials through the suction pipe, also be placed briefly under slight pressure to accelerate the extraction.

According to the invention a tight sliding seal is fitted to the cover of the pressure vessel above the wall of the mixing container and/or at the top edge of the latter, giving a tight seal against the mixed materials. Such a seal has the advantage that mixed materials (dust, sand, etc.) thrown up my the mixing tools do not reach the zone of the pressure vessel above the mixing container, where the more sensitive pressure-tight sliding seals are located.

Also mounted are, on the cover of a pressure vessel according to the invention above the mixing container and in addition to the feed-opening, a vacuum flange for mounting an extraction or vacuum pump pipe, and on the cylinder wall or on the cover of the pressure vessel outside the above mentioned mixed materials seal, a pressure flange for connection of a pressure pipe. Such mounted vacuum and pressure-flanges are on the one hand independent of filling operations, and on the other hand gas supplied or extracted in this way always flows from the outer zone of the pressure vessel into the mixing container, so that this system also avoids mixed materials thrown up by turbulence reaching the outer zone of the mixing container.

It is a further feature of the invention that there are mounted in the wall of the pressure vessel apertures with pressure-tight seals closeable by pressure plates, and in the wall of the mixing container at the same height apertures closeable by plates with seals tight against the mixed materials. These openings make it possible to have access from outside to essential functional components of the mixer, e.g., the mixing tools, or e.g., to clad the mixing container from the inside with anti-wear linings. Here it is also advantageous if the anti-wear linings are fixed by simple through-holes in the wall and/or in the base of the mixing container, permitting easy and rapid lining replacement.

For certain applications it is advantageous if with a mixer according to the invention a condenser is fitted to the cover of the pressure vessel for the condensation of gases pumped out of the mixed materials. Here is can be useful if the condenser for the return flow of the condensate is connected at its lowest point with the vacuum flange or other opening in the cover of the pressure vessel above the mixing container. There are, for example, mixing processes in which physical or chemical reactions caused by the mixing operation generate heat energy which heat up the mixed materials and in some circumstances this is unwanted. Such unwanted heating-up can be avoided by e.g. pumping out a partially gaseous component of the mixed material, whereby the further evaporation of this component resulting from extraction extracts from the mixed material the required heat of evaporation. Since, however, in general the composition of the mixed material must not be modified, it is advantageous if the extracted gas is condensed in a condenser (heat exchanger) and then returned to the mixed material in liquid form.

In a further embodiment of a pressure-resistant mixer according to the invention a condenser is also mounted on the cover of the pressure vessel, which at its lowest point is connected with a drain opening outside the mixing container.

This would, for example, be advantageous if a solvent is to be removed from the mixed material by pumping out. Here advantageously the drain is mounted so that it opens not only outside the mixing container but also outside the pressure vessel. At the drainage outlet the solvent can be recovered and reused for the next charge.

Above the mixed materials or directly in contact with the latter, pressure- and/or temperature-measuring devices can be fitted to the cover of the pressure vessel, and coupled with a control device for setting a predetermined pressure or a predetermined pump delivery. Since pressure and temperature for gaseous systems are mutually dependent variables, a pressure setting can advantageously also be used to effect a corresponding temperature control.

Another possibility for the temperature control of mixed materials can be offered by a further embodiment of a pressure-mixer, in which the wall and base of the mixing container are hollow to house the flow of a cooling and/or heating medium.

In conformity with the invention, with such a pressure-resistant mixer, pipes are fitted to the base of the pressure vessel adjacent to the through opening, these pipes passing through the sealing edge and opening into the intermediate spaces between three sliding seals located one above the other at intervals between the sealing edge and the drainage ring. The seal round the through-opening required for pressure operation is thus designed so that between several individual sealing rings at least 2 chambers result which are suitable for the feeding and/or extraction of cooling and/or heating media through corresponding pipes. The insides of the wall and of the base of the mixing container are connected by holes going right round the drainage ring with the same intermediate spaces between the sliding seals into which the pipes open.

Advantageously the inside of the base and the inside of the wall of the mixing container is further divided up by a partition into two sections, one of which is connected to the inlet and the other to the outlet for the heating or cooling medium, these two sections being connected with each other at the top edge of the mixing container wall. In this way the flowing heating or cooling medium must flow along the entire base and wall surface of the mixing container before it reaches the outlet, giving highly efficient heating or cooling. Such a possibility of heating or cooling the mixing container is above all advantageous if the mixed material contains hardly any gaseous constituents and temperature control by regulation of gas pressure is not possible.

Considering the many different applications of the mixer it is advantageous in conformity with the invention to use such pressure-tight seals which are tight against both over-pressure and under-pressure. In a further special embodiment of the pressure-resistant mixer, in which particularly high sealing efficiency is required for the system, in addition to the cover for the mixing container, a further pressure-seal cover for the pressure vessel is provided. Both covers can be fixed under the same swiveling arm. Whilst the pressure-seal cover is already brought into its final closed position by the swinging movement of the sealing cover mechanism, the closing and pressing on of the sealing cover for the mixing container is carried out by an auxiliary drive unit, e.g; spring, hydraulic or pneumatic jack, electric motor, etc., mounted on the swiveling arm or on the pressure seal cover. The sealing cover for the mixing container is rotatably mounted on the auxiliary drive.

In this way it is possible to operate solely with stationary seals in the zone of the drainage ring and to dispense with the sliding seals which are not adequate for very high pressure-resistance requirements.

Furthermore this embodiment can be extended in that the drive motors for the mixing container and the mixing tools are also mounted inside the pressure vessel, so that the relatively small sliding seals of the drive shafts for the mixing container and mixing tools can also be dispensed with. With such an embodiment of the pressure resistant mixer, solely stationary seals can therefore be used. This can be advantageous or even essential if there are particularly great differences compared with atmospheric pressure, or when operating with toxic gases inside the pressure vessel. The pressure tight execution of electrical connections and cooling media for the drive motors can then be executed in conventional and known ways.

Figure 2:
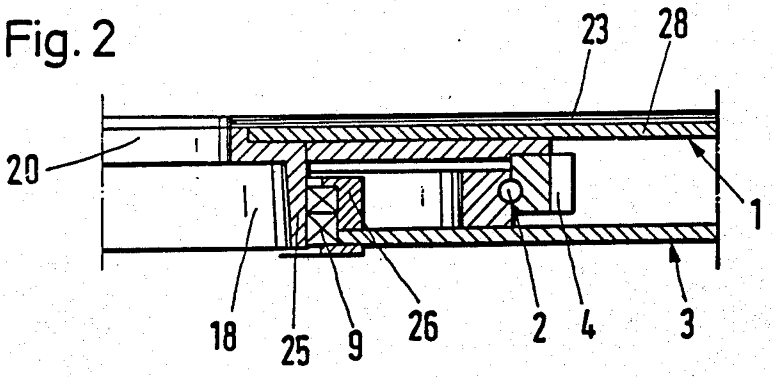
Figure 3:
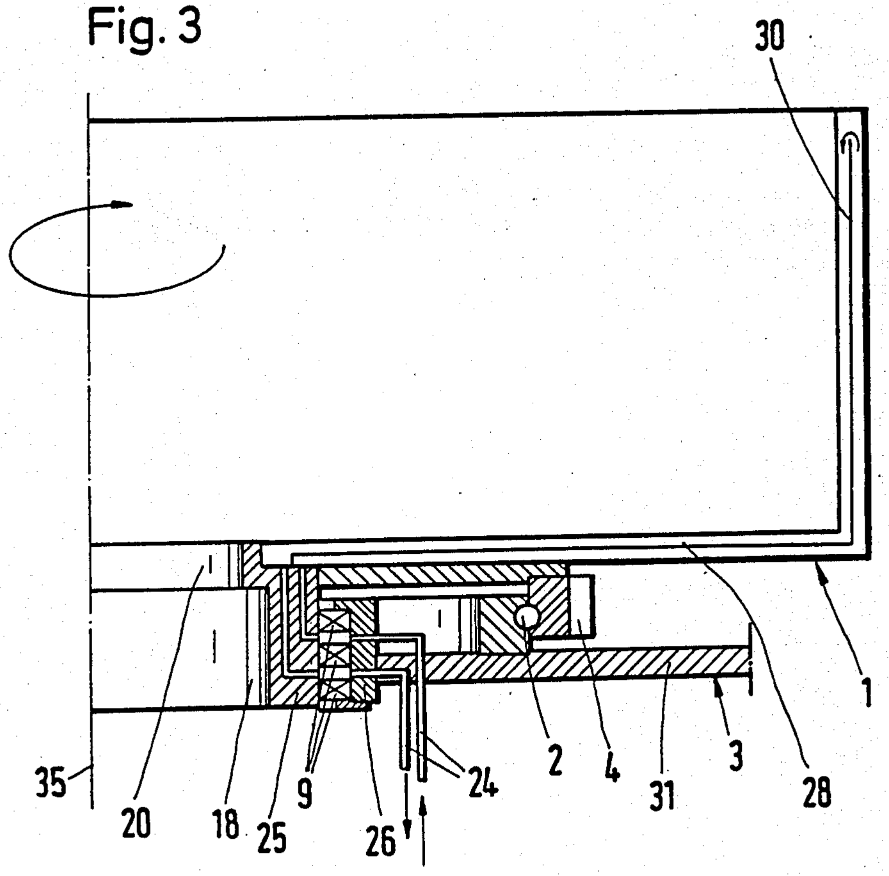
Figure 4:
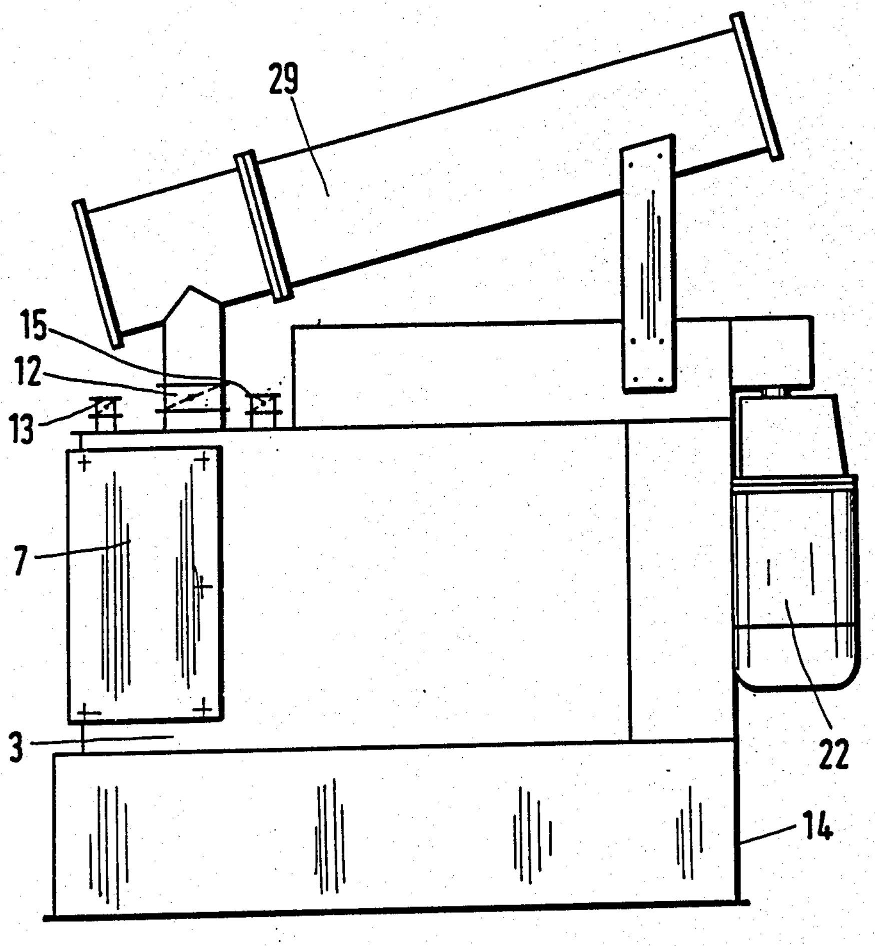
Figure 5:
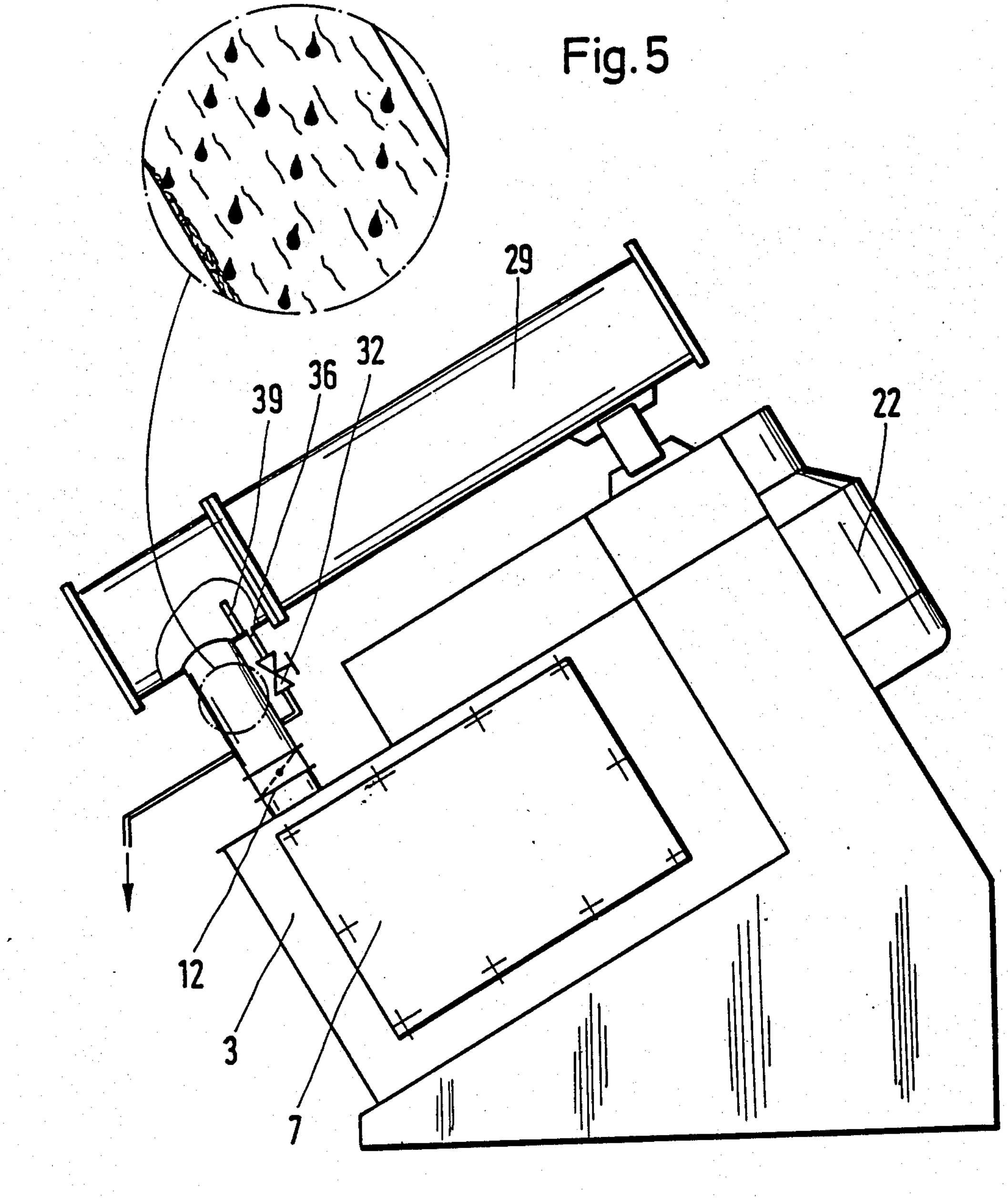
Figure 6:
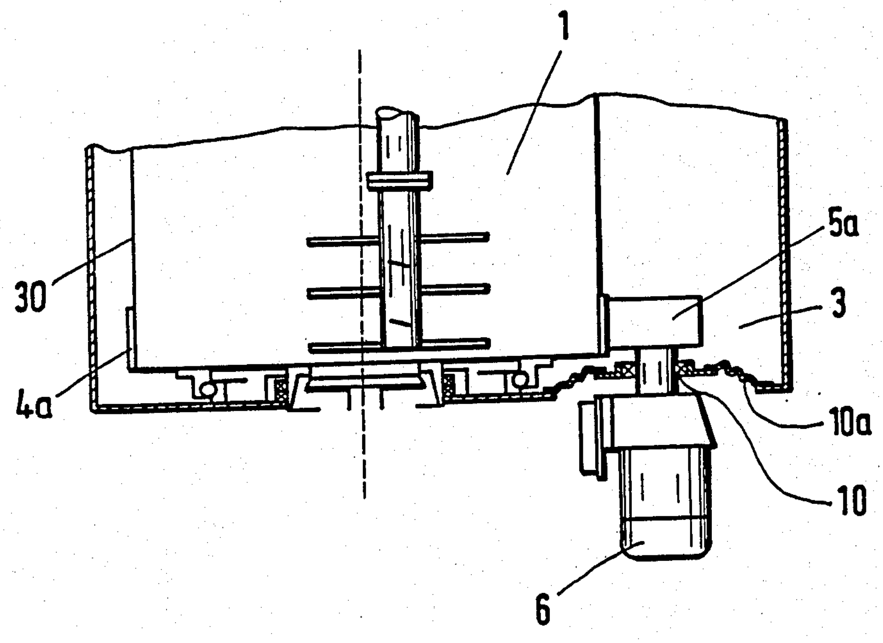
Figure 7:
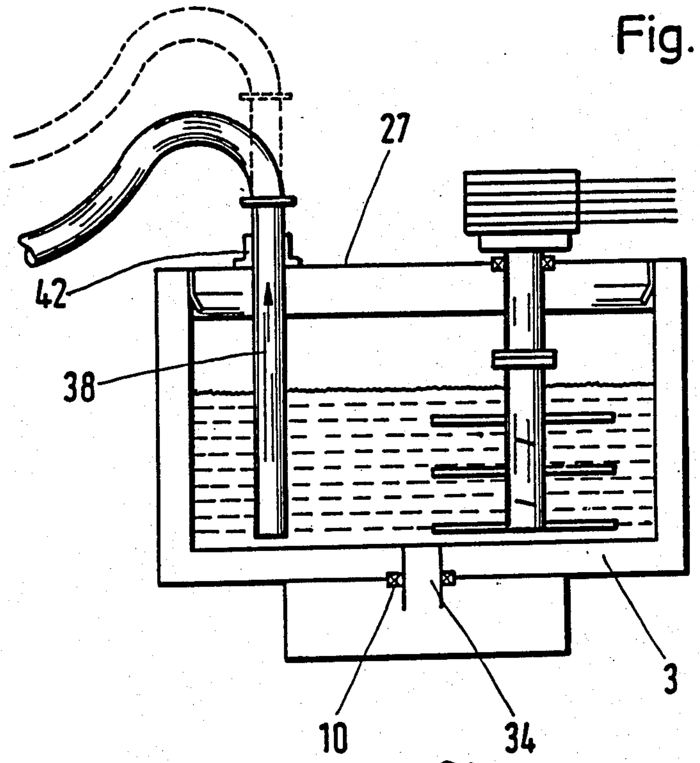
Figure 8:
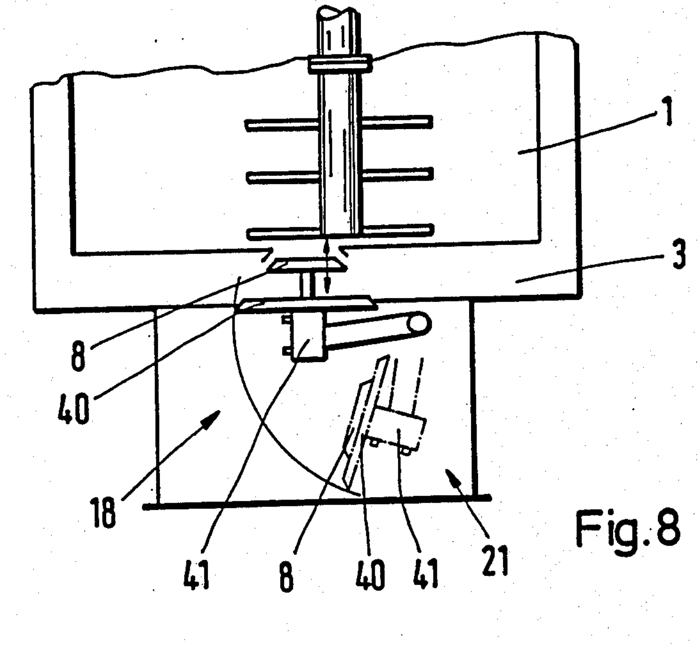

Further advantages, features and applications of the present invention are explained in the following description of concrete embodiments with reference to the related drawings. These show:

FIG. 1 A section along a vertical plane through a pressure mixer according to the invention, FIG. 2 A sectional view of a part of the mixing container bottom with drainage ring and pressure vessel base, FIG. 3 A section through a mixing container with hollow wall and related seals and pipes, FIG. 4 Side view of a pressure vessel with condenser and vertical axis of rotation of mixing container, FIG. 5 Mixing container with condenser and inclined axis of mixing container, FIG. 6 A sectional view of a pressure-resistant mixer with friction wheel drive for mixing container, FIG. 7 A sectional view of a pressure resistant mixer with a suction pipe as emptying device, FIG. 8 A sectional view of a pressure resistant mixer with sealing cover and additional pressure seal cover.

FIG. 1 shows the vertical section through a pressure mixer according to the invention with vertical axis of rotation of mixing container 1. Pressure vessel 3 is mounted on a frame 14. Inside pressure vessel 3 the mixing container 1 is rotatably mounted on a ball-bearing 2. The drainage opening 20 of the mixing container 1 is sealed by means of a sealing cover 8 which is connected via a stationary seal giving a tight fit with mixing vessel 1, and on which the sealing cover mechanism 21 is mounted so that it can rotate and be swivelled.

The through opening 18 of pressure vessel base 31 permits on the one hand the insertion of sealing cover 8 into the drainage opening 20 and on the other hand the passage of the mixed materials with cover 8 open after completion of the mixing operation. The emptying and through coaxial holes 20 and 18 are formed by drainage ring 25, on the outside of which the sliding seal 9 forms the connection with the sealing edge 26 of pressure vessel base 31. The ball-bearing 2 is surrounded by a toothed-wheel 4 in which a pinion 5 meshes, which is in its turn driven by shaft 34 of motor 6 equipped with a sliding seal 10 and thus rotates the mixing container 1. By means of the drive motor 22, which is mounted on machine frame 14, the shaft 33, equipped with sliding seal 11, for mixing tool 17 is driven by a V-belt. The shaft is equipped with a protective ring 19 underneath sliding seal 11, this serving to protect the sliding seal 11 from thrown up mixed material.

A seal 16 fitted to the cover 27 of pressure vessel 3 lies against the top edge of mixing container 1 and prevents the escape of mixed materials from the mixing container 1 into the space of pressure vessel 3 surrounding mixing container 1. Above mixing container 1 there are feed opening 15 and extraction flange 12 in cover 27 of pressure vessel 3. Pressure flange 13 is also mounted in the cover 27 of pressure vessel 3 but is, however, located outside the circle described by seal 16. In this way gas introduced through pressure flange 13 first flows into the space inside the pressure vessel surrounding the mixing container and from there through the seal 16 which is tight only against the mixed materials into mixing container 1. If, on the other hand, gas is extracted from mixing container 1 through extraction flange 12, the gas located outside the mixing container 1 in pressure vessel 3 also flows from outside through the seal 16. This system prevents a gas flow from mixing container 1 passing through seal 16 into the surrounding space in pressure vessel 3, which could in some circumstances result in penetration by the mixed materials into this zone.

On side wall 36 of pressure vessel 3 and of mixing container 1, at the same height, there are apertures 37 or 37*a*, closed by covers 7 or 7*a*, through which the inside of mixing container 1 is accessible. This permits maintenance and repair operations e.g. on mixing tools 17, or also the replacement of anti-wear linings 23 with which the inside of the mixing container can be covered.

FIGS. 2 and 3 show details of the bearing of mixing container 1 and the sealing of mixing container or pressure vessel 1 or 3 in the zone of the bottom side emptying or through holes 20 or 18. Furthermore FIG. 2 also shows an anti-wear lining 23 indicated by several horizontal lines. In the cross section in FIG. 2 ball-bearing 2 with toothed-wheel 4 surrounding ball-bearing 2 is shown. At the bottom of mixing container 1, emptying hole 20 and through hole 18 are surrounded by a drainage ring 25, which has a fixed connection with the base of fixing container 1. Between the outside of the drainage ring 25 and sealing edge 28 of pressure vessel 3 there is the sliding seal 9, which seals off the inside of pressure vessel 3 and thus of the connected mixing container 1 against the outside atmosphere, whereby mixing container 1 with drainage ring 5 is rotatable in relation to pressure vessel 3 with sealing ring 26 along sliding seal 9. The diameter of the drainage ring 25 and of sealing ring 26 is selected so that the sliding seal 9 can be a seal of normal commercially available shape and size.

FIG. 3 shows in addition to the sections shown in FIG. 2 a different form of a mixing container wall 3 which in this case consists of a hollow wall through which a cooling or heating medium flows. For this purpose, pipes 24 are passed through base 31 of pressure vessel 3, made pressure-tight in conventional way, into sealing rim 26, opening there into the intermediate spaces between three superimposed annular sliding seals 9. Drainage ring 18 has holes right round its circumference which in their turn constitute the connection between these intermediate spaces and the inside of the mixing container wall 31. A partition divides the inside of mixing container wall 31 into two sections connected at the top edge of mixing container 1, one of these sections being connected with the inlet and the other with the outlet of the heating or cooling medium pipes 24. This gives an effective heat exchange over the whole mixing container wall 31.

FIGS. 4 and 5 show two embodiments of a pressure resistant mixer according to the invention in side view. With the pressure resistant mixer shown in FIG. 4, the axis of rotation of mixing container 1 is vertical, and in FIG. 5 this axis is somewhat inclined. Both figures show an outline of some of the components already referred to in the description of FIG. 1, i.e., machine frame 14, drive motor 22, pressure vessel 3 with feed opening 15, vacuum flange 12, pressure flange 13, and the sealed lateral wall aperture through pressure plate 7. In addition a condenser 29 is also mounted on cover 27 of pressure vessel 3, which is connected at its bottom end with vacuum flange 12. The gas sucked through the vacuum flange 12 condenses in a heat exchanger of condenser 29 and can then be passed through the same aperture in liquid form back into the mixed materials.

FIG. 4 shows vacuum flange 12 larger than filling aperture 15 and pressure flange 13. FIG. 5 only shows the vacuum aperture 12.

Before the condensate flows back through vacuum flange 12 into the inside of mixing container 1, it can be held in the bottom zone of condenser 29 in front of a collector plate 39 and drained off through drain 36 by opening valve 32, if required. This possibility is made use of if solvents are to be removed from the mixed material and not allowed to flow back into the mixed material. The solvent flowing out through drain 36 can then be collected outside mixing container 1, preferably also outside pressure vessel 3, and e.g. reused for the next charge.

The enlarged section shown in FIG. 5 indicates how, on the one hand a gaseous substance is pumped into the condenser through a pipe attached to vacuum flange 12, whilst at the same time and through the same aperture the cooled and recondensed gas flows back into mixing container 1 as a liquid.

FIG. 6 shows a pressure resistant mixer in which the mixing container 1 is driven from drive motor 6 via a friction wheel 5*a*. Sliding seal 10 or the related outer rim of sliding seal 10 is connected pressure tight via a flexible sleeve 10*a* with a corresponding hole in base 31 of pressure vessel 3. In this way shaft 34 of drive motor 6 has sufficient clearance to adjust to the radial movements of friction wheel 5*a* on drive ring 4*a* in relation to mixing container axis 35, without placing sliding seal 10 under mechanical load with the resultant risk of leaks.

FIG. 7 shows a pressure resistant mixer in an embodiment in which in base 28 of mixing container 1 there is no emptying hole 20 but instead there is a suction pipe 38 mounted in vertical direction on cover 27, through which mixed material capable of flowing out of mixing container 1 can be extracted. Suction pipe 38 is connected via a seal not shown with a flange 42 of cover 27 of pressure vessel 3 and can be moved up and down in vertical direction, so that the end of suction pipe 38 is located either above the mixed material or inside the mixed material as required. The possibility of taking suction pipe 38 out of the mixed material can be an advantage if the mixed material can assume under some conditions of the mixing operation an extremely viscous consistency, or also contains solid substances of very coarse structure. A suction pipe 38 entering the mixed material would then be subject to unnecessary mechanical strains and would furthermore interfere with the circulation of the mixed materials.

Furthermore, such a suction pipe has the advantage that no emptying aperture 20 is required in bottom 28 of mixing container 1 and no through hole 18 for the mixed material needs to be present in base 31 of pressure vessel 3. The relatively large sliding seal 9 can thus also be dispensed with, so that in base 31 of pressure vessel 3, only sliding seal 10 for shaft 34 of drive motor 6 has to be present, this being advantageously located in this embodiment in the centre of the mixing container 28, with a fixed-mounting on the latter.

FIG. 8 shows lastly a further embodiment of the pressure-resistant mixer, in which the relatively large sliding seal 9 on drainage ring 25. (see FIG. 2), can also be dispensed with. In this embodiment, in addition to sealing cover 8 of mixing container 1, there is also a pressure-seal cover 40 for the through-aperture 18 of pressure vessel 3. The sealing cover 8 is in this case e.g. by means of a hydraulic or pneumatic drive, on sealing-cover mechanism 21 or on pressure-seal cover 40, made moveable in relation to the latter in the direction of the symmetrical axis of concentric covers 8, 40. In open state, both covers 8, 40 are essentially superimposed. After closing of pressure-seal cover 40 by means of pressure-seal mechanism 21, the sealing cover 8 is pressed by means of auxiliary drive unit 41 into the emptying aperture 20 of mixing container 1. Hereby the sealing cover 8 is rotatably mounted on the auxiliary drive. The pressure-tight seal of the emptying or through-hole 20 or 18 is provided, however, by a stationary seal on the edge of the pressure-seal cover 40. Even with non-flowing mixed materials, the use of the relatively large sliding seal 9 can thus be avoided. Insofar as in pressure vessel 3, drive motors 6 and 24 for mixing container 1 and mixing tools 17 are also mounted, such a pressure-resistant mixer can be operated completely without sliding seals and can thus meet particularly high tightness requirements.

I claim:

1. A pressure resistant mixing apparatus, which comprises rotatable container means for mixing material, said container means comprising a side wall and a bottom wall with a drainage opening, pressure vessel means for enclosing said container means, means for mixing material in said container means, said mixing means being positioned eccentrically to the axis of said container means, and drive means for selectively driving said mixing means and said container means, said pressure vessel means comprising a side wall, a cover, and a bottom wall with a through-opening coaxial with the drainage opening in said container means.

2. The mixing apparatus of claim 1 wherein said container means comprises a cylindrical mixing container, and said pressure vessel means comprises a cylindrical pressure vessel for said cylindrical mixing container.

3. The mixing apparatus of claim 2 wherein said drive means for the cylindrical mixing container comprises motor means and transmission means for transferring motive force from said motor means to said mixing container, said motor means being positioned outside said pressure vessel.

4. The mixing apparatus of claim 3 wherein said transmission means comprises a mixing container drive shaft extending into the interior of said pressure vessel, said transmission means including means for sealing said mixing container drive shaft in said pressure vessel.

5. The mixing apparatus of claim 4 wherein the means for sealing said mixing container drive shaft comprises slidable seal means for enclosing in a wall of said pressure vessel.

6. The mixing apparatus of claim 3 wherein said drive means for said mixing means comprises motor means mounted outside said pressure vessel and transmission means for transferring motive force from said motor means to said mixing means.

7. The mixing apparatus of claim 6 wherein said transmission means for said mixing means includes a mixer drive shaft extending into said mixing container and means for sealing said mixer drive shaft to said pressure vessel.

8. The mixing apparatus of claim 7 wherein the means for sealing said mixer drive shaft comprises slidable seal means for enclosing in the cover of said pressure vessel.

9. The mixing apparatus of claim 8 including means for shielding the slidable seal means from material in said mixing container.

10. The apparatus of claim 9 including means for condensing gases discharged from the mixing container.

11. The mixing apparatus of claim 7 including means for withdrawing material from the mixing container.

12. The mixing apparatus of claim 11 including a suction pipe for withdrawing material from the mixing container.

13. The mixing apparatus of claim 1 wherein said drainage opening and through-opening are concentric with the axis of the mixing container, said pressure vessel including means for sealing said pressure vessel at said through-opening.

14. The apparatus of claim 13 wherein said sealing means for said pressure vessel at said through-opening comprises drainage ring means and at least one slidable seal.

* * * * *